(12) United States Patent
Barankova et al.

(10) Patent No.: US 6,524,538 B2
(45) Date of Patent: Feb. 25, 2003

(54) METHOD AND APPARATUS FOR PLASMA TREATMENT OF GAS

(76) Inventors: Hana Barankova, Ullerakersvagen 64, SE-756 43 Uppsala (SE); Ladislav Bardos, Ullerakersvagen 64, SE-756 43 Uppsala (SE)

( * ) Notice: Subject to any disclaimer, the term of this patent is extended or adjusted under 35 U.S.C. 154(b) by 9 days.

(21) Appl. No.: 09/825,330

(22) Filed: Apr. 4, 2001

(65) Prior Publication Data

US 2001/0020582 A1 Sep. 13, 2001

Related U.S. Application Data

(62) Division of application No. 09/303,574, filed on May 3, 1999, now Pat. No. 6,238,629.

(30) Foreign Application Priority Data

Apr. 28, 1999 (SE) ................................. 9901527

(51) Int. Cl.$^7$ ................................. B01J 19/08
(52) U.S. Cl. .................. 422/186.04; 204/164; 204/168; 204/174; 204/177
(58) Field of Search ...................... 422/186.04; 204/164, 204/168, 174, 177

(56) References Cited

U.S. PATENT DOCUMENTS

| | | |
|---|---|---|
| 5,573,733 A | 11/1996 | Salama |
| 5,603,893 A | 2/1997 | Gundersen et al. |
| 5,686,789 A | 11/1997 | Schoebach et al. |
| 5,804,149 A | 9/1998 | Ota et al. |
| 5,855,856 A | 1/1999 | Karlson |
| 5,951,742 A * | 9/1999 | Thwaites et al. ............. 422/22 |

FOREIGN PATENT DOCUMENTS

FR 2639172 5/1990

OTHER PUBLICATIONS

F.K. McTaggart, "Plasma/Chemistry In Electrical Discharges," 1967, pp. 1–14, Elsevier Publishing Company, Amsterdam/London/New York no month available.

L. Bardos et al., "High Rate Jet Plasma–Assisted Chemical Vapour Deposition," 1988, Elsevier Sequoia/The Netherlands, pp. 265–270 no month available.

L. Bardos, "Radio Frequency Hollow Cathodes for the Plasma Processing Technology," 1996, Surface and Coatings Technology, Elsevier Science S.A. pp. 648–656 no month available.

(List continued on next page.)

Primary Examiner—Kishor Mayekar
(74) Attorney, Agent, or Firm—Young & Thompson

(57) ABSTRACT

A method and an apparatus for plasma treatment of gas, particularly for transformation, passivation and stabilization of polluting and toxic admixtures is disclosed. A flowing gas (1) to be treated is passed through a hollow cathode (2) provided with a counter electrode (5) and a hollow cathode discharge plasma (3) is generated by a generator (4) connected to the hollow cathode (2). The flowing gas (1) undergoes interactions with oscillating electrons (6) in the hollow cathode discharge plasma being generated in the gas. The interaction of the hollow cathode discharge plasma with inner walls (8) of the hollow cathode is controlled and the inner walls should have a temperature below its melting point, whereby the inner walls can provide a catalytic effect. The inner walls may also release wall species (9) promoting plasma-chemical reactions in the hollow cathode discharge plasma. The flowing gas is then exhausted as a transformed gas (10) after being treated in the hollow cathode discharge plasma. A gas to be treated may also be mixed with an auxiliary gas (7) for obtaining a suitable mixing of gas, whereby the auxiliary gas intensifies an ultraviolet radiation and/or plasma-chemical reactions.

3 Claims, 8 Drawing Sheets

OTHER PUBLICATIONS

L. Bardos et al., "Thin Film Processing by Radio Frequency Hollow Cathodes" 1997, Surface and Coatings Technology, Elsevier Science S.A., pp. 723–728 no month available.

K.H. Schoenback et al., "Microhollow Cathode Discharges," Jan. 1, 1996, App. Phys. Lett. 68(1), American Institute of Physics, pp. 13–15.

J.W. Frame et al., "Microdischarge Devices Fabricated in Silicon," Sep. 1, 1997, Appl. Phys. Lett. 71(9), American Institute of Physics, pp. 1165–1167.

A. El–Habachi et al., "Emission of Excimer Radiation from Direct Current, High–Pressure Hollow Cathode Discharges," Jan. 5, 1998, Appl. Phys. Lett. 72(1), American Institute of Physics, pp. 22–24.

B. Gellert et al., "Generation of Excimer Emission in Dielectric Barrier Discharges," 1991, Appl. Phys. B52, Springer–Verlag, pp. 14–21 no month available.

L. Bardos et al., "New Way for High–Rate a–Si Deposition," 1987, Journal of Non–Crystalline Solids, North–Holland, Amsterdam, pp. 281–284 no month available.

A. Czernichowski et al., "Low Temperature Incineration of Some Volatile Organic Compounds by Gliding Discharges Under Atmospheric Pressure," Aug. 1991, International Union of Pure and Applied Chemistry, 10th International Symposium on Plasma Chemistry, Bochum, Germany, pp. 1–6.

V. Puchkarev et al., "Plasma Processing of Diesel Exhaust by Pulsed Corona Discharge," 1998, Plasma Exhaust After–Treatment, Society of Automotive Engineers, Inc., Warrendale, PA, pp. 107–111 no month available.

* cited by examiner

METHOD AND APPARATUS FOR PLASMA TREATMENT OF GAS

RELATED APPLICATION

This application is a division of application Ser. No. 09/303,574, filed on May 3, 1999, now U.S. Pat. No. 6,238,629, the entire contents of which are hereby incorporated by reference.

FIELD OF THE INVENTION

The present invention relates to a method and an apparatus for plasma treatment of gas, particularly for transformation, passivation and stabilization of polluting and toxic admixtures.

BACKGROUND

The treatment of different solid, liquid and gas wastes and hazardous residues represents a very important environmental technology, particularly treatment of industrial flue gases and exhaust gases from engines, due to their pollution of the air by $NO_x$, $SO_x$, soot, hydrocarbons, volatile organic compounds, etc. The most common methods are based on chemical reactions, pyrolytic combustion and different catalyst filters. Chemical filters are often used for treatment of flue gas from industrial and energy production. They can treat large throughputs of gases, but their substantial disadvantage is formation of byproducts (e.g., $NH_3$, $CaO_2$, etc.). Catalysts are regularly used for instance in car exhaust after-treatment. Typical catalyst materials are based on Pt or different metal oxides e.g., $V_2O_5$, $WO_3$, $TiO_2$, ZnO, etc. Despite their simplicity the catalyst filters often exhibit limited efficiency, particularly in Diesel engines, and strong temperature dependence.

Contrary to the conventional chemical and pyrolytical technologies, the gas discharge plasma treatment often leads to apparently more efficient transformation reactions with little or no undesirable byproducts. This is given by the possibilities either to achieve extremely high gas temperatures in the plasma, or to generate very reactive species through dissociation, activation or ionization of gaseous and volatile components in the plasma. Pyrolytic effect of plasma can be achieved for instance in atmospheric pressure arc torches at high powers generating large current densities in the ionized gas. These plasmas are called equilibrium or thermal plasmas and they are characterized by high collision frequencies, which equalize energy of all particles present. The energies (temperature) of electrons and ions are practically the same and they approach the energy of neutral species in the partially ionized plasma. The gas temperature is high, up to several thousands degrees centigrades, hence the term "thermal" plasma. The thermal plasma is very suitable for irreversible thermal treatments e.g., for combustion of solid and liquid wastes, or in plasma metallurgy, etc. However, due to heating of all species evenly the energy consumption in thermal plasmas is typically high. At equilibrium conditions the gaseous products of plasma chemical reactions are often unstable due to almost equivalent probability of reverse chemical reactions. The efficiency of thermal plasmas for plasma chemical treatment of gases is therefore low in comparison with so called non-equilibrium plasmas. Non-equilibrium plasma can be simply generated at reduced gas pressure. Then the frequency is lower and due to different electron and ion masses (the electron mass is $9.11 \times 10^{-31}$ kg, the proton mass is $1.67 \times 10^{-27}$ kg) the electrons can acquire much higher kinetic energy than ions. When the plasma is generated by a very high frequency electromagnetic field, the power is acquired mainly by mobile electrons, while heavy ions are not able to even follow changes of the field and move only due to their thermal energies similar to the rest of the neutral gas. This leads to the plasma in which the chemical reactions are very effective while the bulk of gas remains relatively cold. The non-equilibrium plasma is therefore often noted as "cold" plasma. Interactions of high-energy electrons with gas can produce extremely reactive atoms and radicals, which are able to generate subsequent chemical reactions not available at normal conditions. A very high plasma chemical activity of such plasmas can be utilized in different applications (see for instance a pioneering work of F. K. McTaggart: "Plasma Chemistry in Electrical Discharges", Elsevier, Amsterdam, 1967). However, due to necessity of pumping systems, the reduced and low-pressure non-equilibrium plasmas are not utilized in industrial scale waste treatments.

An emerging technology in this field is non-equilibrium plasma of atmospheric pressure. The degree of energy non-equilibrium is somewhat lower than in low-pressure plasmas and strongly depends on the arrangement of individual reactors. However, the absence of pumps simplifies all systems substantially and in principle allows their immediate application for large gas throughputs. On the other hand the efficiency of known systems is still not high enough for their utilization in an industrial scale. The non-equilibrium conditions at atmospheric pressure can be achieved in several ways. The most direct way is an injection of an electron beam into the gas. The high power electron beam interacts with the gas and generates non-equilibrium plasma along its penetration depth. A serious disadvantage of the method is that it acts only in a limited space and that the penetration depth at atmospheric pressure is rather short. Moreover the electron gun system is quite complicated and expensive and it does not show satisfactory high energy efficiency. The more common way of generation of non-equilibrium plasma for gas treatment is a high voltage breakdown of the gas in form of many filamentary current paths—plasma streamers. A typical representative is corona discharge between sharp edged or sharp tipped electrode (cathode or anode) and the grounded counter electrode. At a high frequency generation (orders of 1 kHz up to more than 1 MHz) and high voltage (10–30 kV), the counter-electrode may be covered by a dielectric wall (barrier) and then the system works with a barrier (also "silent") discharge.

Another very sophisticated reactor is composed from an axial system of at least one pair (typically three pairs) of knife sharp electrodes facing each other by sharp edges and connected to the high voltage generator, see for instance French patent No. 2639172 (1988) to H. Lesueur et al. Arc streamers between related electrodes are gliding over the sharp edges between opposite electrodes and also around the axial system of electrodes following the phase movement in a 3-phase generator.

The generation of local current streamers in all systems mentioned above provides local non-equilibrium plasmas when the rest of the gas remains "cold". A great advantage found in coronas and barrier discharges is a pulsed generation, see U.S. Pat. No. 5,603,893 (1997) to M. Gunderson et al. The high power pulse allows quick pumping of the power into the streamers causing strong non-equilibrium plasma usually at the beginning of the pulse with the relaxation into the equilibrium conditions depending on both the pulse shape and the duty cycle. Although all these systems in both stationary and pulsed regimes are very advanced, the region where the gas interacts with streamers is not dense enough or of sufficient volume (bulk) for treatment of all the gas passing the reactor zone. Generation of bulk atmospheric pressure non-equilibrium plasma is possible by microwave power. This type of generation is based on very high frequency (typically 2.45 GHz and more) connected with the pumping of power directly into electrons. Although the advantage of microwave systems is a denser plasma volume than in the case of streamers, substantial disadvantages are low efficiency and short lifetime of microwave generators and limited plasma dimensions (related to the size of the wave-guide). Therefore, in spite of their discrete streamer character the most serious candidates considered for industrial atmospheric pressure plasma treatment of gas are still the pulsed corona, pulsed barrier discharge and the gliding arc.

Non-equilibrium plasma with very high degree of activation can be generated at reduced pressures by hollow cathodes. Since their discovery by F. Paschen in 1916, the hollow cathodes have been used for quite a long time as the sources of intense light for atomic spectroscopy. Experiments of Little and von Engel in 1954 revealed clearly the principle of an exceptionally high plasma density and activation in hollow cathodes through so called "hollow cathode effect". This effect is based on a special geometry in the cathode, where the opposite walls have the same electric potential with respect to a common anode. In a direct current (DC) arrangement of the diode gas discharge the cathode wall is covered by cathode dark space in which electrons emitted from the cathode surface are accelerated towards the anode. In the suitable "hollow geometry" when the cathode fall regions of opposite cathode surfaces are close to each other, the emitted electrons can meet the opposite region with the equal opposite electric field of the cathode fall region. Electrons are therefore repelled back and undergo oscillations called a "pendulum electron motion". This kind of motion leads to confinement of electrons and intensifies their interactions with the gas present in the hollow cathode, which promotes dramatically overall efficiency of the ionization and subsequent effects, terminating in a very high density active plasma. Hollow cathodes are capable of production of electron beams having energies comparable to the cathode fall potential and, moreover, their extraordinary abilities are already known also for generation of different plasma chemical reactions in gases for applications mainly in surface processing. Moreover, due to non-Maxwellian energy distributions and existence of high energy electron populations the hollow cathode discharge emits an intense radiation in UV ($\leq$300 nm) and VUV ($\leq$200 nm) regions capable to breakdown most chemical bonds and to induce different photochemical reactions.

Compared to the DC generation of the hollow cathode, an alternating current (AC) and particularly a radio frequency (RF) generation provides a number of advantages. In this case the most positive body in the system is the gas discharge plasma outside the cathode. This plasma can substitute a "virtual anode" and is naturally flexible with respect to any cathode geometry. As a consequence, the hollow cathode behaves as a unipolar discharge (see e.g. L. Bárdos et al., Thin Solid Films 1987, or recent reviews by L. Bárdos et al., Surf. Coat. Technol. 1996 and 1997). The AC generation has also an important thermal stabilizing effect.

To satisfy conditions for the hollow cathode effect the distance between the opposite walls in the cathode must be in suitable relation with the thickness of the cathode fall, or the space charge sheath in the RF case, to enable the electron exchange. One of the most important parameters is the gas pressure, which affects both the thickness of the cathode regions and the electron recombination by collisions. Therefore the hollow cathodes are operated typically at reduced pressures, below the order of 10 Torr. Very recently the cylindrical closed end DC molybdenum hollow cathodes with diameters below 0.1 mm were reported to work at air pressures of 350 Torr≈50 kPa (K. H. Schoenbach et al., Appl. Phys. Lett. 1996). Similar DC cathodes with diameters of 0.2–0.4 mm and 0.5–5 mm in depth were reported to sustain the nitrogen discharge even beyond the atmospheric pressure (>750 Torr≈100 kPa), see J. W. Frame et al., Appl. Phys. Lett, 1997. Atmospheric pressure xenon discharges were generated in a 0.1 mm diameter dc hollow cathode by A. Al-Habachi and K. H. Schoenbach (Appl. Phys. Lett. 1998). These DC hollow cathode discharges were able to produce intense UV and VUV excimer emissions. Arrays of the closed end micro-hollow cathodes have been used in UV lamp applications, see U.S. Pat. No. 5,686,789 (1995) to K. H. Schoenbach et al.

No works, arrangements or results have yet been found published regarding the utilization of hollow cathodes for treatment of a flowing gas or for passivation of polluting and toxic gas mixtures neither at atmospheric pressure nor at reduced pressures. Moreover there are no works known yet reporting on AC generated hollow cathodes or related reactors for this purpose at atmospheric pressure.

SUMMARY

An object of present invention is therefore to overcome the drawbacks of the above described prior art techniques and to provide a method and an apparatus for plasma treatment of gas, particularly for transformation, passivation and stabilization of polluting and toxic admixtures.

In a first aspect according to the present invention, a method for plasma treatment of gas comprises steps of flowing a gas to be treated through a hollow cathode with a hollow cathode discharge plasma being generated by a generator coupled with said hollow cathode and with a counter electrode. The gas undergoes interactions with oscillating electrons in the hollow cathode discharge plasma generated in the gas or in a mixture of the gas and an auxiliary gas, in which the auxiliary gas intensifies an ultraviolet radiation and/or plasma-chemical reactions. The hollow cathode discharge plasma also interacts with the inner walls of the hollow cathode having a temperature below its melting point, the inner walls may have a catalytic effect and may also release wall species promoting plasma-chemical reactions in the hollow cathode discharge plasma. After being treated in the hollow cathode discharge plasma the gas will be flowing out as a transformed gas.

In a second aspect according to the present invention an apparatus is disclosed for plasma treatment of gas according to the method of the present invention, particularly for transformation, passivation and stabilization of polluting and toxic admixtures. The apparatus comprises generator means, particle filter means, solid state catalyst means and the means for heating and/or cooling. The apparatus consists of at least one hollow cathode connected with the means for heating and/or cooling, whereby the cathode has a length, which is longer than a distance between opposite walls and is disposed for generation of a hollow cathode discharge plasma by means of the generator coupled with the hollow cathode and a counter electrode. The counter electrode is disposed as an inlet of a gas to be treated in the hollow cathode discharge plasma generated in the gas or in a mixture of the gas and an auxiliary gas, whereby the particle filter is connected with the means disposed in the counter electrode for filtering of the gas to be treated. The filter is installed upstream the gas before the hollow cathode and a quenching electrode connected with the means for heating and/or cooling is a transformed gas after the hollow cathode and the solid state catalyst for additional treatment of the transformed gas.

BRIEF DESCRIPTION OF THE DRAWINGS

The objects, features and advantages of the present invention as indicated above will become apparent from the description of the invention given in conjunction with the appended drawings, wherein.

DETAILED DESCRIPTION

Figure 1:
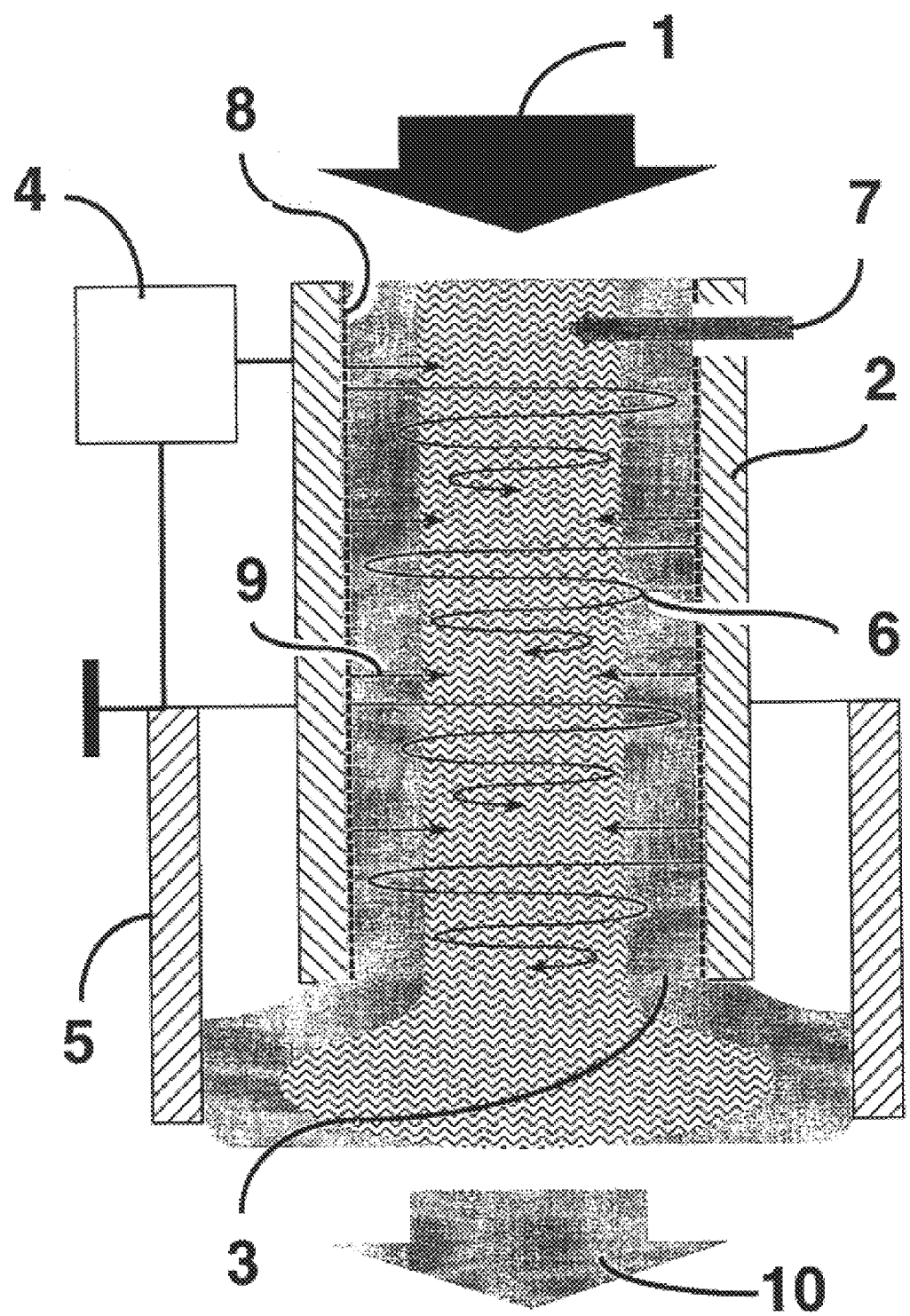
FIG. 1 is a schematic representation of the method for plasma treatment of gas, particularly for transformation, passivation and stabilization of polluting and toxic admixtures according to the present invention.

Referring to FIG. 1, the method according to the present invention will be described. A gas 1 to be treated is flowing through a hollow cathode 2 with a hollow cathode discharge plasma 3 generated by a generator 4 connected to the hollow cathode and with a counter electrode 5. The gas 1 undergoes interactions with oscillating electrons 6 in the hollow cathode discharge plasma. The plasma is generated in the incoming gas to be treated or in a mixture of this gas with an auxiliary gas 7. The auxiliary gas could be admitted for intensifying an ultraviolet radiation and/or plasma-chemical reactions. Typical example may be an excimer (excited dimer) gas, which forms a slightly bound excited molecular state of complexes that do not possess a stable ground state. Besides halogen dimers, for example iodine, $I_2$, or chlorine, $Cl_2$, also noble gases like xenon, Xe, or argon, Ar, or their mixtures can be used to form excimer complexes in plasma state (see B. Gellert and U. Kogelschatz, Appl. Phys. B 52, 1991). The excimer gas causes excimer radiation typically in UV or VUV regions originated inside the hollow cathode discharge plasma. This radiation may be capable to destroy most chemical bonds and the auxiliary gas can therefore play the role of an "in-situ" gas catalyst in the hollow cathode discharge plasma, during the treatment of the gas. The hollow cathode discharge plasma interacts with the inner walls 8 of the hollow cathode, which may become hot due to ion bombardment and must be kept below its melting temperature. The surface of inner walls may have a catalytic effect if the cathode material or a wall coating is properly selected. Typical catalytic material is platinum, Pt, but also other metals and oxides may be selected, depending on expected catalytic effect. Due to ion bombardment the inner walls of tie hollow cathode may also release wall species 9 promoting plasma-chemical reactions in the hollow cathode discharge plasma. This type of catalysis can be very important in an overall efficiency of the gas treatment in the hollow cathode discharge plasma according to the present invention. After being treated in the hollow cathode discharge plasma the gas is flowing out as a transformed gas 10.

Figure 2:
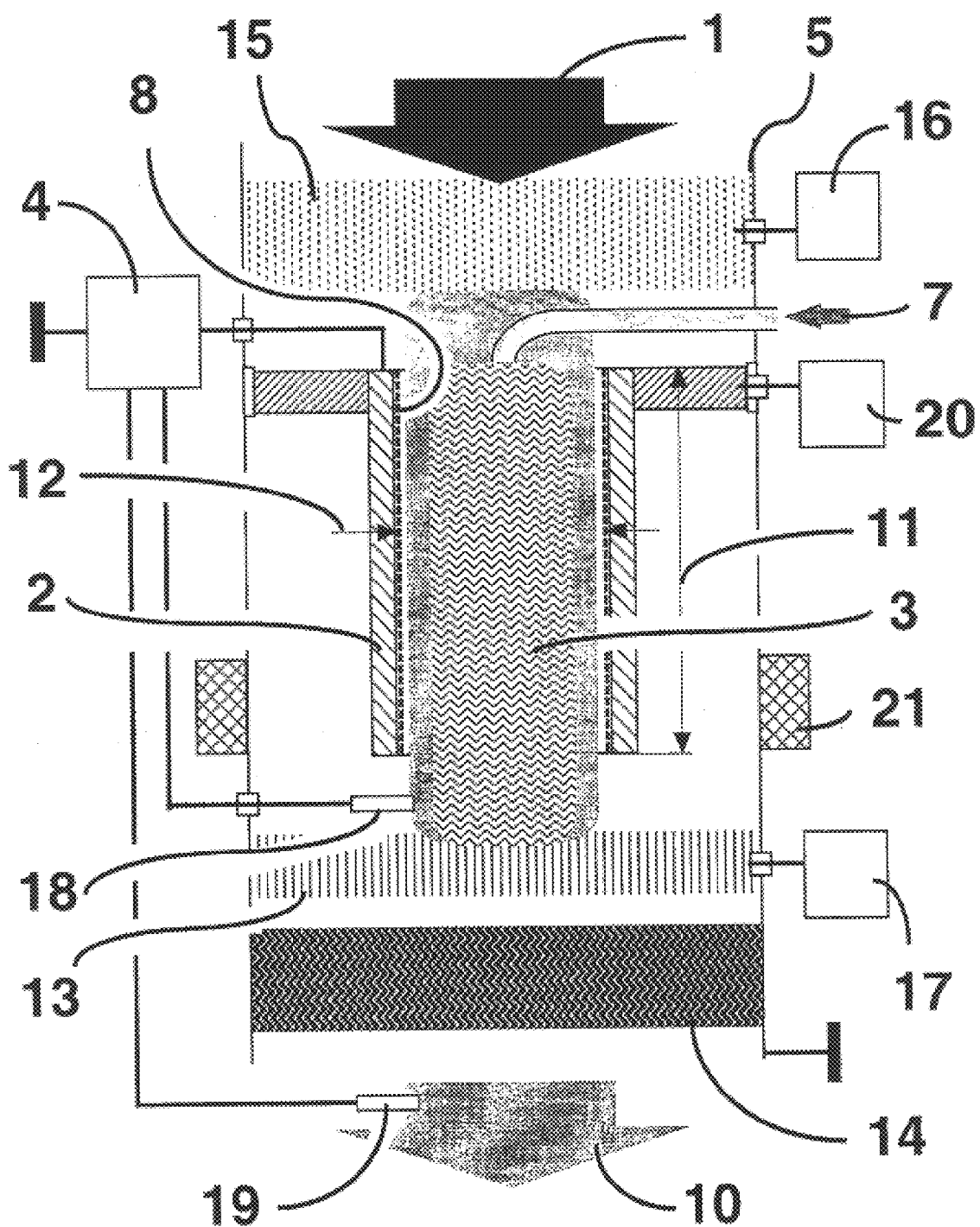
FIG. 2 is a schematic view of an embodiment of an apparatus for plasma treatment of gas, particularly for transformation, passivation and stabilization of polluting and toxic admixtures according to the method described in the present invention.

Referring to FIG. 2, an embodiment of the apparatus for plasma treatment of gas according to the method described in the present invention will be described. At least one hollow cathode 2 is used and connected to the means 20 for heating and/or cooling and has a length 11 longer than a distance 12 between opposite walls 8. A suitable ratio between this length 11 and the distance between the walls 8 (width) should exceed a factor of two. The appropriate width of the cathode could preferably be less than 1 mm. Walls 8 could either be composed of or coated by a catalyst material. The cathode is disposed for generation of a hollow cathode discharge plasma 3. The plasma is generated by a generator 4 connected to the hollow cathode and a counter electrode 5, whereby the counter electrode could favorably serve also as an inlet of a gas 1 to be treated. Although both DC and AC generators can be used, for the purpose of this invention an AC generator should provide power of high frequency. Higher frequencies, for instance radio frequencies up to 100 MHz, are favorable for generation of non-equilibrium plasma, in which only electrons are capable to follow changes of the field and absorb its energy. Pulsed power is also suitable for generation of non-equilibrium chemically active plasma. The hollow cathode discharge plasma is generated either in the gas to be treated or in a mixture of this gas and an auxiliary gas 7. The particle filter 15 can be installed in the counter electrode and is disposed for mechanical filtering of the gas 1. The particle filter is connected with the means 16 for heating and/or cooling. Preheating of the gas by the filter can favorably enhance chemical reactions during the gas treatment in the hollow cathode discharge plasma. A quenching electrode 13 is installed downstream the gas after the hollow cathode. The quenching electrode is disposed to slow down chemical reactions in the gas flowing after treatment in the hollow cathode discharge plasma and to stabilize a part of resulting products. The temperature of the quenching electrode is very important and the electrode is therefore connected to the means 17 for heating and/or cooling. The solid state catalyst 14 is disposed for additional treatment of the transformed gas flowing from the hollow cathode discharge plasma. A parameter detector system 18 may be installed for detection of parameters of the hollow cathode discharge plasma, for instance through an optical emission. The detector can be used through a suitable feedback electronics circuitry for control of the generator 4. Moreover an outlet parameter detector system 19 installed in the transformed gas 10 can be used in similar way for control of the generator 4. Both detectors can be used in an advanced arrangement also for control of the optimal temperature of the particle filter, the hollow cathode and the quenching electrode, respectively. The treatment of the gas 1 in the hollow cathode discharge plasma 3 may be enhanced by a magnetic field generated by magnets 21.

Figure 3:
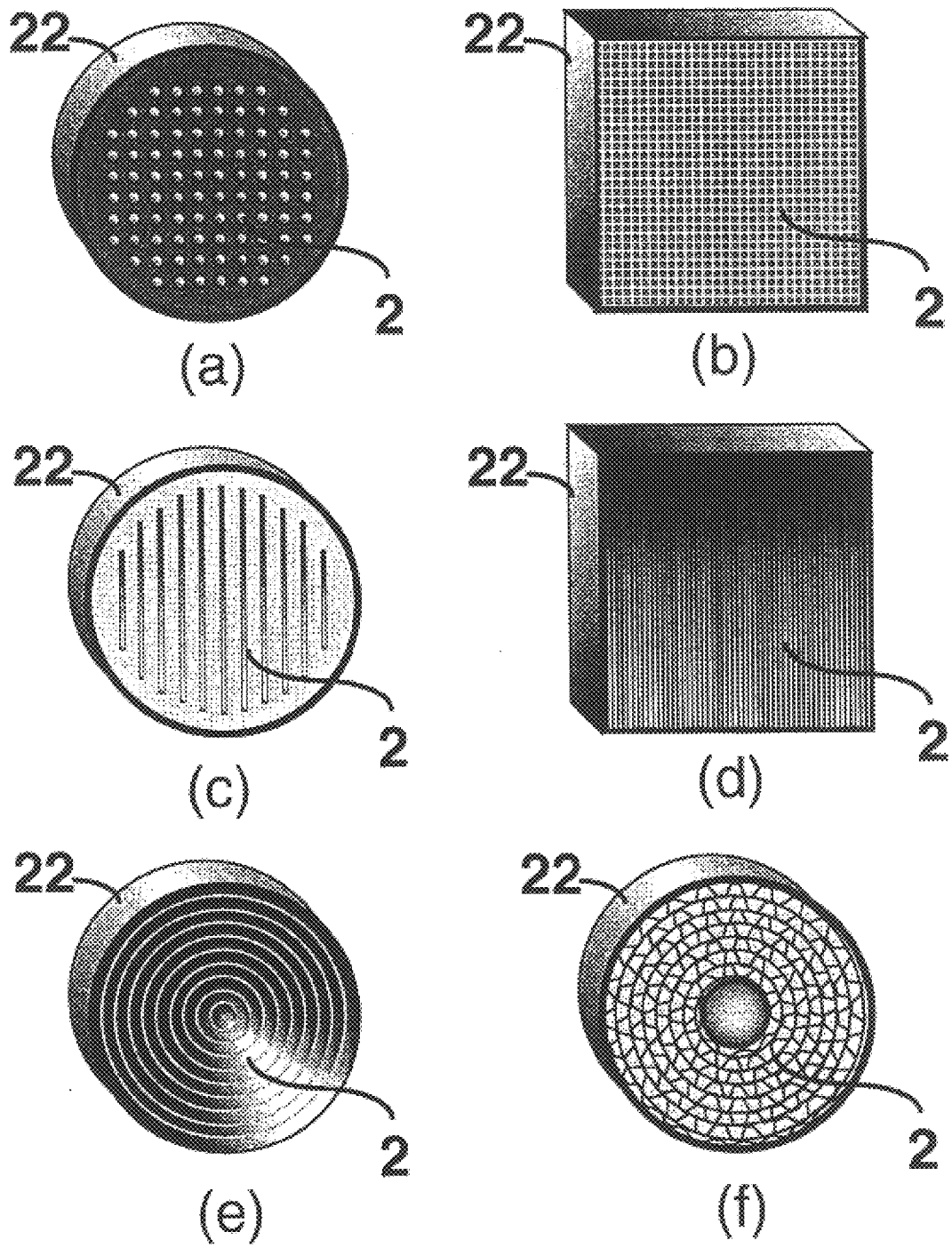
FIG. 3 demonstrates different geometries of integrated systems of hollow cathodes for treatment of gas in apparatus according to the present invention.

By means of FIGS. 3 to 8 a number of embodiments for the present apparatus will be discussed. Referring to FIG. 3 a first example will be described, which is related to the method and the apparatus according to the present invention shown in FIG. 1 and FIG. 2. The schematic figure shows different suitable geometries of integrated systems 22 of hollow cathodes 2 for treatment of gas. FIG. 3(a) shows cylindrical system with an array of cylindrical hollow cathodes. FIG. 3(b) shows a rectangular system of rectangular hollow cathodes. Note that such a geometry may be assembled as a multi-layer system of metal grids. FIG. 3(c) shows the cylindrical system with an array of parallel rectangular hollow cathodes. FIG. 3(d) shows rectangular system with parallel rectangular hollow cathodes. FIG. 3(e) is a cylindrical system with concentric hollow cathodes and finally FIG. 3(f) is a cylindrical system with an inserted structure made from planar metal foil and wrapped metal foil placed on top of each other and rolled into cylinder shape.

Figure 4:
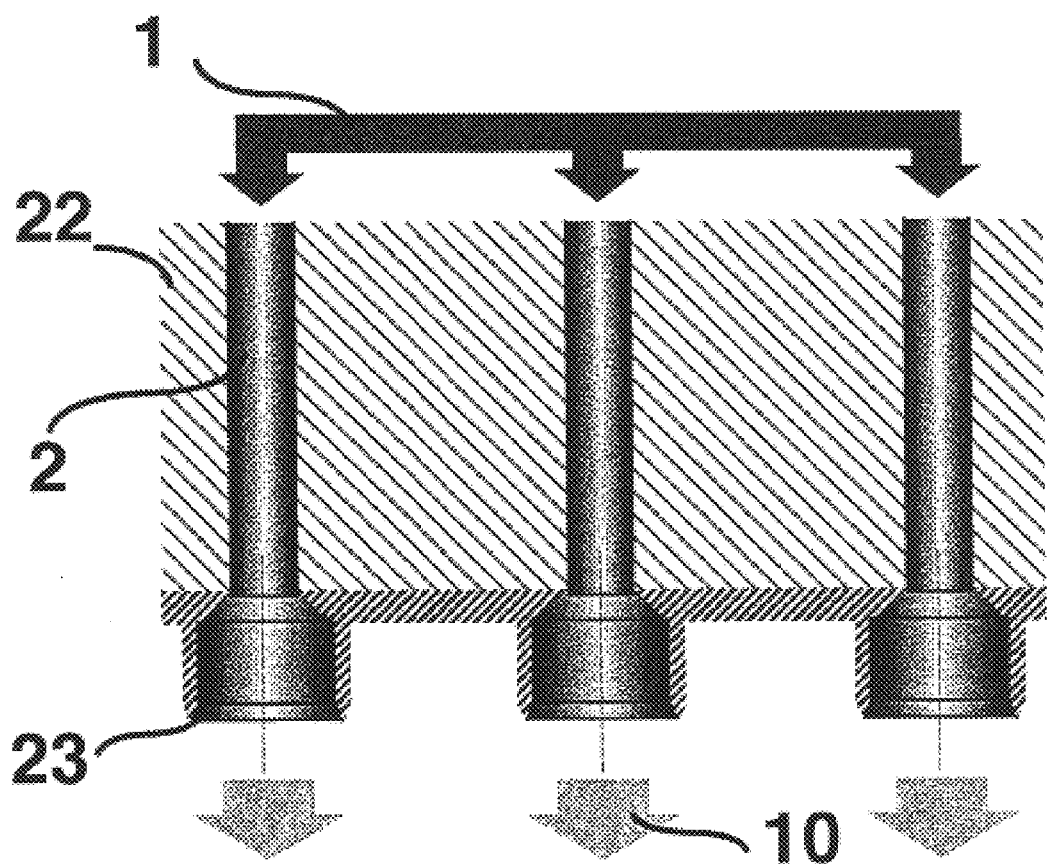
FIG. 4 shows in a schematic view a cross section of an integrated system of cylindrical hollow cathodes aligned with a complementary system forming cathode terminations with sharp edges for enabling initiation and maintenance of the hollow cathode discharge plasma.

Referring to FIG. 4 an embodiment will be described, which is related to the method and the apparatus according to the present invention. A schematic figure shows a cross section of an integrated system 22 of cylindrical hollow cathodes aligned with a complementary system 23 forming cathode terminations with sharp edges. Both systems may be fabricated and aligned by standard methods of micro-mechanics. The sharp edges enhance generation of the discharge at high gas pressures, for instance by forming of a plasma torch, which enables initiation and maintenance of the hollow cathode discharge plasma.

Figure 5:
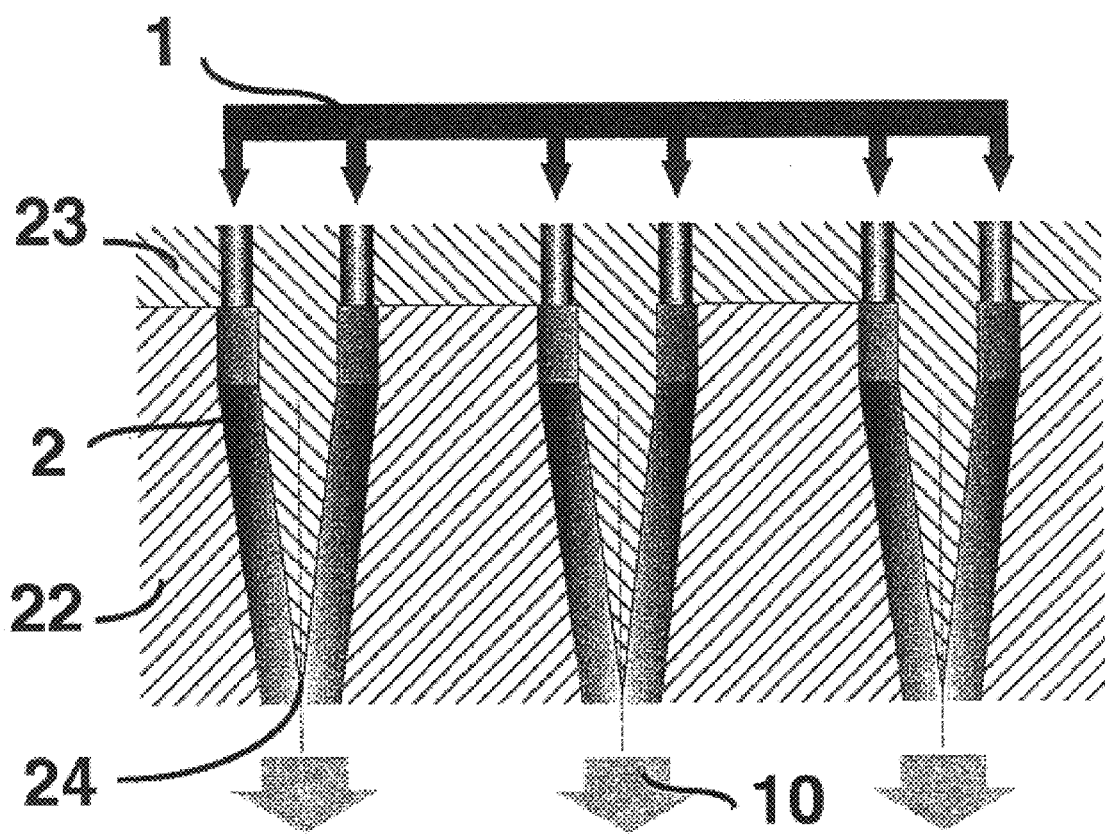
FIG. 5 shows in a schematic view a cross section of an integrated system of hollow cathodes with conical forms aligned with a complementary system having a set of sharp cones centered in the hollow cathodes for enabling initiation and maintenance of the hollow cathode discharge plasma.

Referring to FIG. 5, another embodiment will be described, which is related to the method and the apparatus according to the present invention. The schematic figure shows a cross section of an integrated system 22 of hollow cathodes 2 with conical forms aligned with a complementary system 23 with a set of sharp cones centered in the hollow cathodes 2. Both systems may be fabricated and aligned by standard methods of micro-mechanics. The sharp cones produce high intensity of electric field and enable initiation and maintenance of the hollow cathode discharge plasma.

Figure 6:
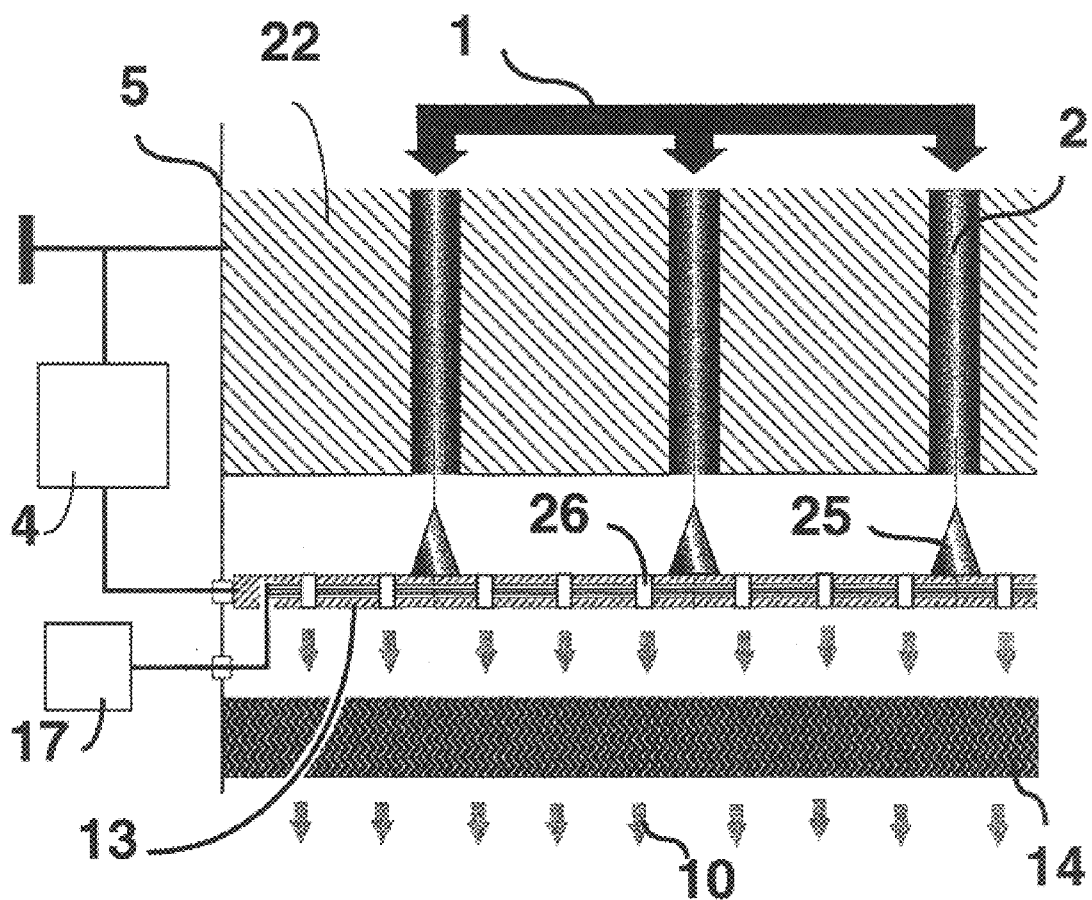
FIG. 6 shows in a schematic view a cross section of an integrated system of hollow cathodes with opposite system of sharp tips arranged at a quenching electrode for enabling initiation and maintenance of the hollow cathode discharge plasma.

Referring to FIG. 6, still a further embodiment will be described, which is related to the method and the apparatus according to the present invention. The schematic figure shows a cross section of an integrated system 22 of hollow cathodes 2 with an opposite system of sharp tips 25 arranged at the quenching electrode 13. The quenching electrode in this example is arranged as a counter electrode connected to a counter pole of the generator 4. A high voltage applied between each tip 25 and the edges of an opposite facing hollow cathode 2 causes gas breakdown and can generate filamentary discharges of a corona type. This discharge enables initiation and maintenance of the hollow cathode discharge plasma. Moreover the system can work as a hybrid plasma system of hollow cathode and corona discharges for treatment of the gas. The transformed gas 10 will flow through a system of holes 26 provided in the quenching electrode 13.

Figure 7:
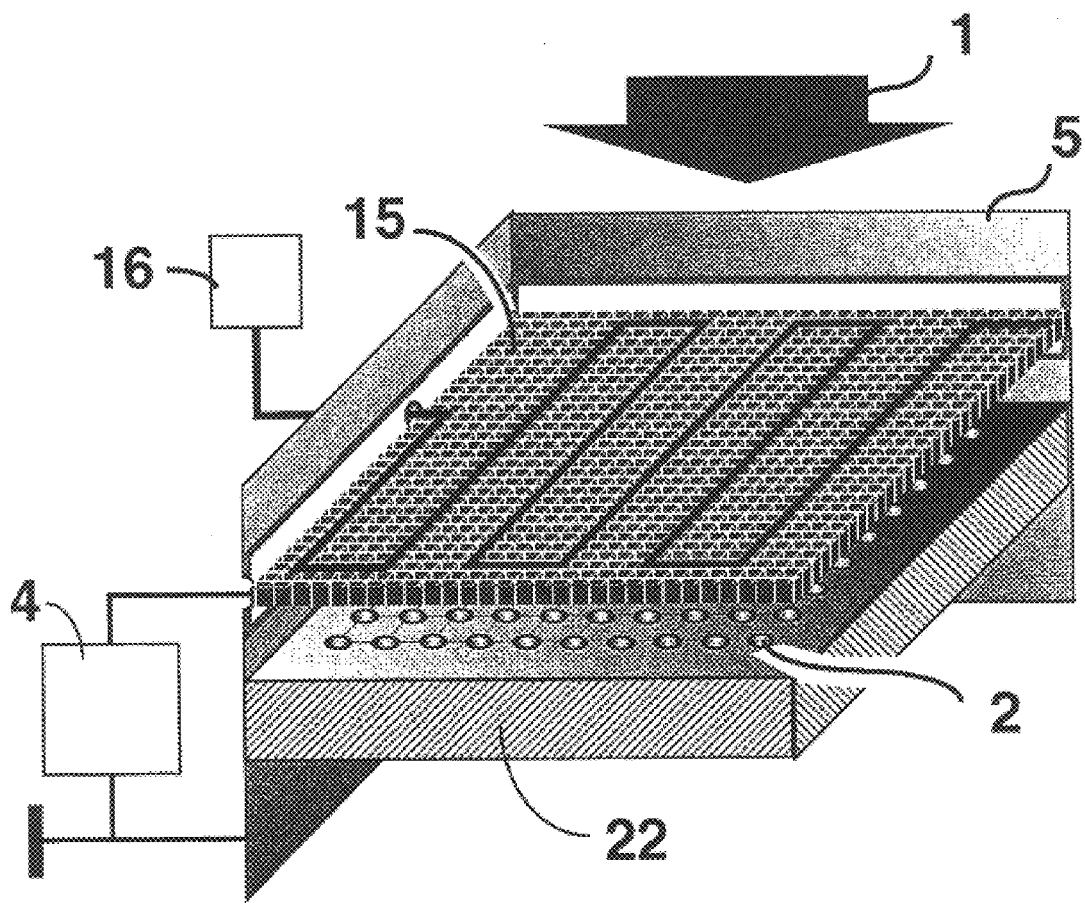
FIG. 7 shows in a schematic view an integrated system of hollow cathodes with a particle filter arranged as a counter electrode.

Referring to FIG. 7, still a further embodiment of the invention will be described, which is related to the method and the apparatus according to the present invention. The schematic figure shows a simple schematic view of an integrated system 22 of hollow cathodes 2 with the particle filter 15 arranged as a counter electrode and connected to the generator 4. It is to be noted that besides the cartridge 5, quenching electrode 13 (see FIG. 6) and the particle filter, the role of counter electrode may also have a solid state catalyst 14 (shown in FIG. 2), or all respective components together, or their combinations.

Figure 8:
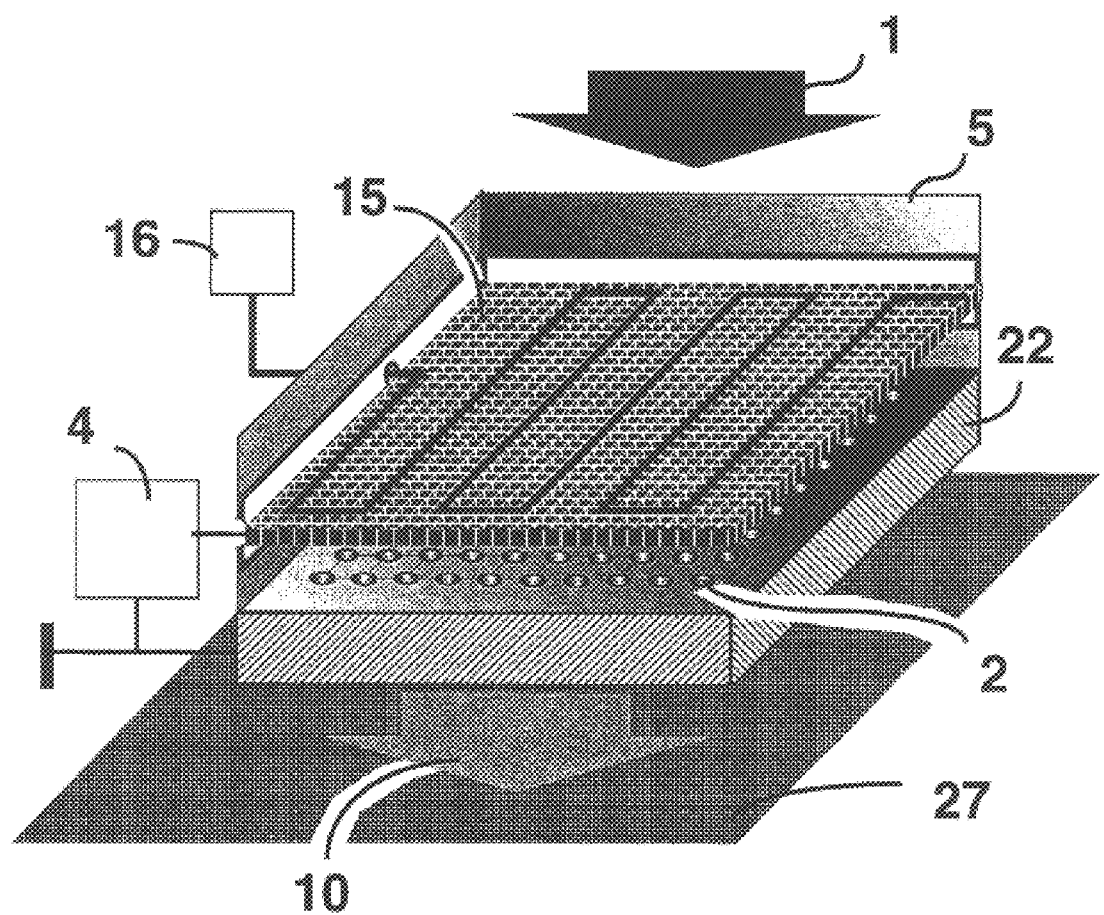
FIG. 8. finally shows in a schematic view an apparatus according to the present invention where a transformed gas is used for subsequent treatment of surfaces.

Finally referring to FIG. 8 an example of utilization of the method and the apparatus according to the present invention for treatment of surfaces will be described. The schematic figure shows a simple schematic view of an arrangement similar to that in FIG. 7, where the transformed gas 10 is a plasma activated gas suitable for subsequent treatment of a surface 27 facing the integrated system 22 of hollow cathodes 2 downstream the gas flow. In this case the quenching electrode 13 and the solid state catalyst (shown in FIG. 2) may be omitted. Surface 27 may be of solid or liquid state. However a treatment of "gaseous surfaces" (i.e. other gases) by the transformed gas 10 from the apparatus according to the present invention may be considered, too.

The inventive method and apparatus for plasma treatment of gas, particularly for transformation, passivation and stabilization of polluting and toxic admixtures is advantageous for being applied for the cleaning of large amounts of flue gas from industrial production, for instance, when arranged in multi-modular systems of filters. Single modules with integrated systems of hollow cathodes made by micro-mechanic technology are suitable for plasma exhaust after-treatment of engines like Diesel motors, turbines, etc. The gas treatment according to the invention can also be used for production of activated gas suitable for subsequent treatment of stationary or moving surfaces. Plasma filters according to the invention can also serve in final or integrated cleaning stages in conventional cleaning and filtering systems.

It will be understood by those skilled in the art that various modifications and changes may be made to the present invention without departure from the spirit and scope thereof, which is defined by the appended claims.

What is claimed is:

1. A method for plasma treatment of gas for transformation, passivation and stabilization of polluting and toxic admixtures, comprising the steps of:

inserting a flowing gas to be treated through a hollow cathode provided with a counter electrode;

generating a hollow cathode discharge plasma by a generator connected to said hollow cathode, wherein said flowing gas undergoes interactions with oscillating electrons in said hollow cathode discharge plasma generated in said gas;

controlling the interaction of said hollow cathode discharge plasma with inner walls of said hollow cathode, said inner walls having a temperature below their melting point, wherein said inner walls provide a catalytic effect and release wall species promoting plasma-chemical reactions in said hollow cathode discharge plasma; and exhausting said flowing gas as a transformed gas after being treated in said hollow cathode discharge plasma.

2. The method of claim 1, comprising the further step of mixing the flowing gas to be treated with an auxiliary gas for obtaining a suitable mixing of gas, wherein said auxiliary gas intensifies ultraviolet radiation and/or plasma-chemical reactions.

3. An apparatus for plasma treatment of gas for transformation, passivation and stabilization of polluting and toxic admixtures, comprising:

means for inserting a flowing gas to be treated through a hollow cathode provided with a counterelectrode;

means for generating a hollow cathode discharge plasma by a generator connected to said hollow cathode; wherein said flowing gas undergoes interactions with oscillating electrons in said hollow cathode discharge plasma generated in said gas;

means for controlling the interaction of said hollow cathode discharge plasma with inner walls of said hollow cathode so that when said hollow walls have a temperature below their melting point, said inner walls provide a catalytic effect and release wall species promoting plasma-chemical reactions in said hollow cathode discharge plasma; and means exhausting said flow gas as a transformed gas after being treated in said hollow cathode discharge plasma.

* * * * *